(12) United States Patent
Hsieh (10) Patent No.: US 8,038,346 B2
(45) Date of Patent: Oct. 18, 2011

(54) DETACHABLE ELECTRONIC PACIFIER THERMOMETER

(75) Inventor: Chih-Wei Hsieh, Hsinchu (TW)

(73) Assignee: Actherm Inc., Hsinchu (TW)

( * ) Notice: Subject to any disclaimer, the term of this patent is extended or adjusted under 35 U.S.C. 154(b) by 454 days.

(21) Appl. No.: 12/371,631

(22) Filed: Feb. 16, 2009

(65) Prior Publication Data

US 2009/0147823 A1 Jun. 11, 2009

Related U.S. Application Data

(63) Continuation-in-part of application No. 11/234,092, filed on Sep. 26, 2005, now abandoned.

(51) Int. Cl.
   *G01K 13/00* (2006.01)

(52) U.S. Cl. .............. 374/151; 374/172; 374/1

(58) Field of Classification Search ............. 374/1, 100, 374/170, 172, 163, 183, 185, 208, 151, 120; 702/136; 340/870.17
See application file for complete search history.

(56) References Cited

U.S. PATENT DOCUMENTS

| | | | | |
|---|---|---|---|---|
| 5,033,864 A | * | 7/1991 | Lasecki et al. | 374/151 |
| 5,044,770 A | * | 9/1991 | Haghkar | 374/208 |
| 5,108,423 A | * | 4/1992 | Lu | 606/234 |
| 5,109,864 A | * | 5/1992 | Lu | 600/549 |
| 5,178,467 A | * | 1/1993 | Chen | 374/151 |
| 5,186,047 A | * | 2/1993 | Gordon et al. | 374/151 |
| 5,211,479 A | * | 5/1993 | Coffey et al. | 374/151 |
| 5,312,187 A | * | 5/1994 | Chiu | 374/151 |
| 5,581,238 A | * | 12/1996 | Chang et al. | 340/573.1 |
| 5,611,622 A | * | 3/1997 | Wang | 374/151 |
| 5,743,648 A | * | 4/1998 | Zeindler | 374/151 |
| 5,782,561 A | * | 7/1998 | Pai | 374/151 |
| 5,829,878 A | * | 11/1998 | Weiss et al. | 374/163 |
| 6,068,399 A | * | 5/2000 | Tseng | 374/163 |
| 6,495,806 B2 | * | 12/2002 | Siefert | 219/494 |
| 6,740,200 B2 | * | 5/2004 | Seymour et al. | 162/118 |
| 6,794,990 B2 | * | 9/2004 | Tseng | 340/584 |
| 6,976,783 B2 | * | 12/2005 | Chen | 374/163 |
| 2006/0072644 A1 | * | 4/2006 | Lee | 374/151 |

* cited by examiner

*Primary Examiner* — Gail Verbitsky
(74) *Attorney, Agent, or Firm* — Leong C. Lei (57) ABSTRACT

An electronic pacifier thermometer is provided. The electronic pacifier thermometer is composed of a pacifier device and a measurement device. The pacifier device has a built-in temperature sensing element (e.g., a temperature sensor) and a connector element. The measurement device contains a display, a circuit board mainly which is controlled by an integrated circuit, and a cable element. The circuit board contains an incomplete temperature measurement circuit that would be made complete through connection to the temperature sensing element. The temperature measurement circuit has a reference resistor (could also be installed inside the pacifier device) whose resistance difference is relative to the temperature sensing element in the pacifier device which is linearly corresponds to the temperature difference between the measured temperature and a pre-determined temperature value. When the pacifier device and the measurement device are attached together by joining the connector and the cable elements, a complete and functional pacifier thermometer is formed to take body temperatures.

4 Claims, 8 Drawing Sheets

DETACHABLE ELECTRONIC PACIFIER THERMOMETER

CROSS-REFERENCE

This is a continuation-in-part of the patent application Ser. No. 11/234,092 filed Sep. 26, 2005, now abandoned.

BACKGROUND OF THE INVENTION (a) Technical Field of the Invention

The present invention generally relates to electronic pacifier thermometers, and more specifically to an electronic pacifier thermometer in which its pacifier device has a built-in temperature sensor and in which its measurement device is structurally detachable so as to facilitate pacifier replacement, cleaning, and sterilization.

(b) Description of the Prior Art

Before the invention of the electronic thermometers, mercury thermometers are widely used in measuring human body temperature. The mercury thermometer relies on the simple principle that mercury changes its volume relative to its temperature. When measuring body temperatures, the mercury in the temperature-sensing probe expands and rises up the capillary in the glass tube of the thermometer. A user then can read the measurement result from the scale marked on or besides the glass tube of the thermometer. In recent years, as mercury is a highly contaminative material, electronic thermometers are developed and widely adopted to replace the mercury thermometers.

The principle behind electronic thermometers is as follows. A timing circuit built in an integrated circuit obtains a reference time interval within which a built-in RC oscillator generates a specific number of oscillation cycles based on an external reference resistor and an external reference capacitor. Then, the reference time interval is used to count the number of oscillation cycles generated by the RC oscillator based on an external thermistor (i.e., the temperature sensing element) and the same reference capacitor within the same reference time interval. A microprocessor then calculates a temperature value based on the measured oscillation cycles and presents the temperature value on a display.

More specifically, the integrated circuit has a pre-determined temperature value (usually 37° C. or 98.6° F.) and the thermistor is configured so that, at the predetermined temperature, the oscillation frequency based on the thermistor and the reference capacitor is identical to the oscillation frequency based on the reference resistor and the reference capacitor. Then, using the pre-determined temperature value as a basis, the difference between the two oscillation frequencies can be used to calculate the measured temperature. Since the two oscillation frequencies are based on the same reference capacitor, the resistance variation between the reference resistor and the thermistor at a specific temperature should be linearly corresponding to the temperature variation between the measured temperature and the pre-determined temperature so as to achieve accurate measurements. Conventionally, an electronic thermometer has the reference resistor and the thermistor fixedly installed on its temperature measurement circuit. The pairing of the reference resistor and the thermistor in the electronic thermometer is therefore not replaceable.

Electronic thermometers, due to their sturdiness, non-contamination, better measurement accuracy, and shorter measurement time, have gradually replaced the traditional mercury thermometers. In recent years, as they are constantly improved and enhanced as technologies advance, electronic thermometers have gained widespread popularity not only in ordinary households but also in public health facilities such as hospitals.

When using an electronic thermometer to measure a baby's body temperature, an accurate measurement is usually difficult as the baby is constantly moving. On the other hand, when the baby is sucking a pacifier, the baby is usually more emotionally stable and more susceptible to temperature measurement. Pacifier thermometers combining a pacifier and an electronic thermometer are therefore developed.

Conventional pacifier thermometers usually have the pacifier and the measurement device (including the temperature sensing element and the circuit board) integrated together and cannot be separated apart. As such, there are a number of disadvantages:

1. To protect the baby from various virus or bacterium infections, the pacifier is required to be washed and cleaned constantly. A pacifier thermometer often becomes defective from the wetness.

2. When the pacifier is damaged from the baby's constant sucking and biting, the entire pacifier thermometer has to be discarded even though the measurement device is perfectly functional.

3. As the pacifier and the measure device are integrated together, the measurement device is often damaged from the baby's sucking and biting. Again, the entire pacifier thermometer has to be discarded.

4. For sanitary reasons, public health facilities often reserve a pacifier thermometer for use by a single baby, which is not quite economical.

In addition, the display of some electronic thermometers does not have a backlight so that it is sometimes difficult to recognize the measurement result on the display. For some electronic thermometers, even though the display is equipped with a backlight, the backlight is lit only when the electronic thermometer reaches a stable reading and is turned off air a very short period of time, leaving no time for a user to pick up the electronic thermometer and recognize the measurement result.

Some electronic thermometers are equipped with a buzzer to deliver an alarming sound to remind a user when a stable reading is reached. However, the buzzer usually requires an enclosure structure and therefore takes quite a bit of space from the electronic thermometer.

Accordingly, after numerous improvement attempts and experiments, the present invention is provided herein to obviate the foregoing shortcomings and disadvantages of conventional electronic pacifier thermometers.

SUMMARY OF THE INVENTION

The primary purpose of the present invention is to provide a pacifier thermometer having a two-piece detachable structure composed of a pacifier device and a measurement device. The pacifier device has a built-in temperature sensing element and a connector element. The measurement device contains a display, a circuit board, which is mainly controlled by an integrated circuit, and a cable element. The circuit board contains an incomplete temperature measurement circuit that would be made complete with a connection to the temperature sensing element (e.g., a temperature sensor). The temperature measurement circuit has a reference resistor whose resistance difference is relative to the temperature sensing element in the pacifier device which linearly corresponds to the temperature difference between the measured temperature and a predetermined temperature value. When the pacifier device and the measurement device are attached together by joining the connector and the cable elements, a complete and functional pacifier thermometer is formed to take body temperatures. With this two-piece structure, the pacifier of the present invention is easy to replace and sterilize.

The second objective of the present invention is to provide a pacifier thermometer that could deliver accurate measurement results without exact pairing of the temperature sensing element and the reference resistor. The pacifier thermometer has a two-piece detachable structure composed of a pacifier device and a measurement device. The pacifier device has a built-in temperature sensing element, a connector element, and a reference resistor whose resistance difference is relative to the temperature sensing element which linearly corresponds to the temperature difference between the measured temperature and a pre-determined temperature value. The measurement device contains a display, a circuit board mainly controlled by an integrated circuit, and a cable element. The circuit board contains a display and an incomplete temperature measurement circuit that would be made complete with a connection to the temperature sensing element (e.g., a temperature sensor) and the reference resistor. When the pacifier device and the measurement device are attached together by joining the connector and the cable elements, a complete and functional pacifier thermometer is formed to take body temperatures. With this two-piece structure, the pacifier of the present invention is easy to replace and sterilize. In addition, the pacifier thermometer could deliver accurate measurement results without exact pairing of the temperature sensing element and the reference resistor.

The third objective of the present invention is to provide a pacifier thermometer whose measurement results are easier to recognize. The pacifier thermometer, in addition to having a backlight behind the display, has a delay circuit and a reset circuit incorporated into the circuit board of the measurement device. When the pacifier thermometer reaches a stable reading, the backlight is lit immediately for an extended period of time (about 5~10 seconds) before the measurement device is turned off automatically so that the measurement result is easier to recognize. A user could also hold down a power button of the measurement device before it is automatically turned off, so that the backlight would remain lit and the user therefore has more time to read the measured temperature value. When the user releases the power button, both the backlight and the measurement device are turned off simultaneously.

The fourth objective of the present invention is to provide a pacifier thermometer whose buzzer takes up minimum space. The pacifier thermometer has a through hole configured on the circuit board of the measurement device and a flat-shaped buzzer is installed on the through hole. Less space is taken by this design as the conventional enclosure structure commonly found in conventional electronic thermometers is avoided.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figures 1A, 1B:
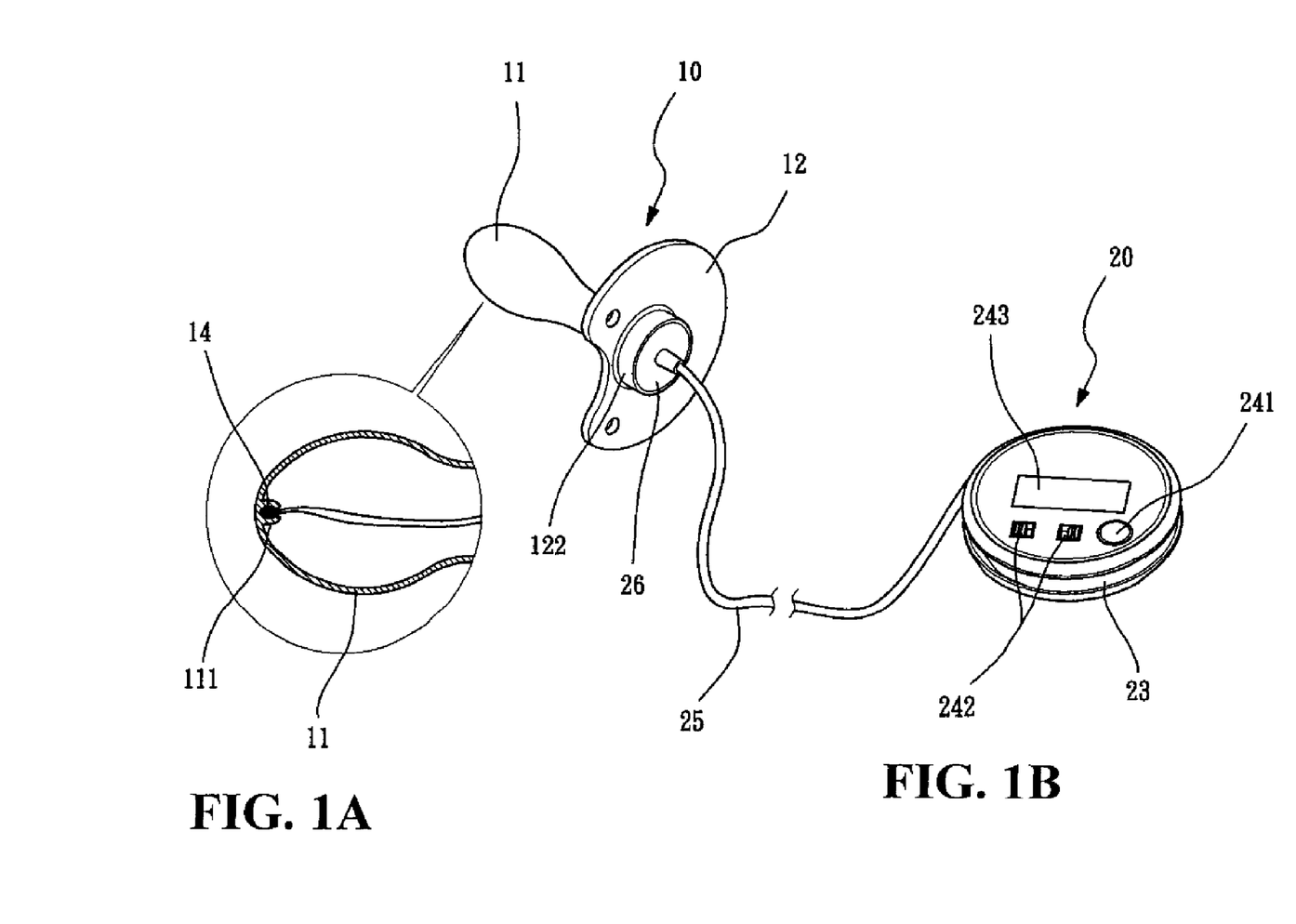
FIGS. 1A and 1B illustrate a pacifier thermometer according to an embodiment of the present invention.
Figure 2:
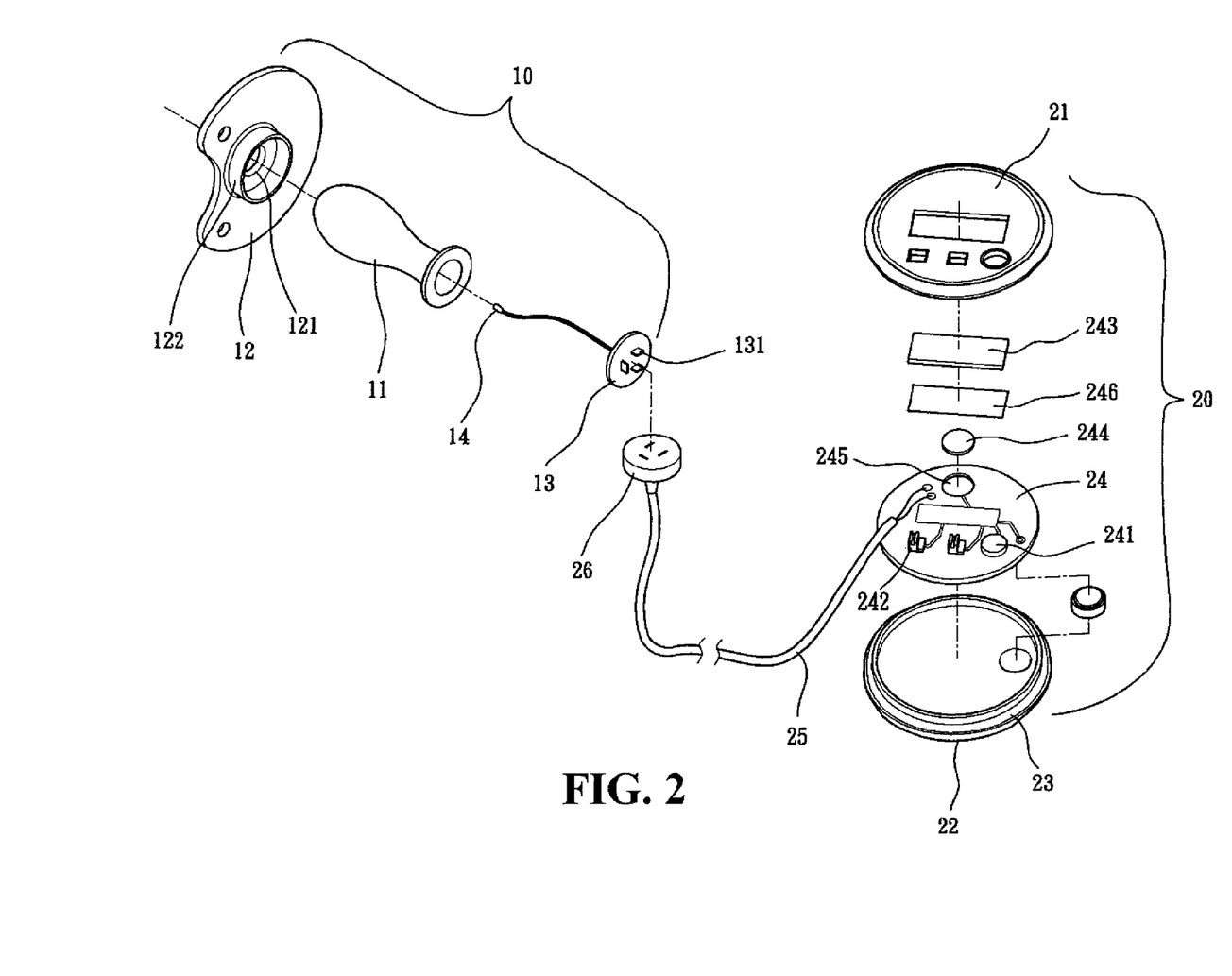
FIG. 2 is a perspective explosion view showing the various components of the pacifier thermometer of FIGS. 1A and 1B.

As illustrated in FIGS. 1A, 1B and 2, the pacifier thermometer according to the present invention has a two-piece modularized structure that could be attached together and detached apart. The pacifier thermometer contains a pacifier device 10 for sensing body temperature and a measurement device 20 that actually performs the measurement. Between the pacifier device 10 and the measurement device 20, there is a connection mechanism for joining the two together into a complete functional thermometer. Such a detachable design contributes to the easier replacement of the pacifier (the temperature sensing element), accurate temperature measurement, and convenient cleaning and sterilization. More details are as follows.

The pacifier device 10 can either contain the mouth member 11 and a supporting member 12, or the pacifier device 10 could also be molded into a single piece using a soft material. The supporting member 12 has an opening 121 allowing the mouth member 11 to pass through for joining the two together. The supporting member 12 has a circular compartment 122 which allows the accommodation of a connector element 13 which has a number of plugs 131. The connector element 13 is configured such that, when it is installed inside the circular compartment 122, its plugs 131 are pointed away from the circular compartment 122. The connector element 13 is connected to a temperature sensing element 14 (e.g., a temperature sensor), which is fixedly installed in a positioning pocket 111 at the tip of the mouth member 11. In alternative embodiments, instead of using a positioning pocket 111, the temperature sensing element 14 is attached to the mouth member 11 with adhesives.

The measurement device 20 has a top cover 21 and a bottom cover 22, both made of hard plastic material. A flange 23 is configured along the circumference of the bottom cover 22. The measurement device 20 further has a circuit board 24 housed between the top cover 21 and the bottom cover 22. The circuit board 24 could be a flexible circuit board or a hard one. The circuit board 24 is configured with a power button 241, a number of control buttons 242, a display (e.g., a LCD screen) 243, and a buzzer 244. The power button 241 and the control buttons 242 are configured such that they protrude a little outside of the top cover 21 when the circuit board 24 is sealed by the top and bottom covers 21 and 22. The buzzer 244 is installed in a through hole 245 of the circuit board 24. The buzzer 244 has a flat shape, instead of having the conventional enclosure structure, so as to effectively reduce the dimension of the measurement device 20. The buzzer 244 would deliver an audible signal (e.g., a buzz) when the power of the measurement device 20 is tuned on, when the measurement device 20 has reached a stable reading for the measured temperature, and when the measure device 20 is turned off. A backlight plate 246 is positioned behind the display 243. The circuit board 24 is configured with an incomplete temperature measurement circuit (i.e., missing the temperature sensing element) including an integrated circuit for controlling the function of the circuit board 24 and a number of electronic components. Among the electronic components, there is a reference resistor (not shown in the drawings) whose resistance difference is relative to the temperature sensing element 14, which linearly corresponds to the temperature difference between the measured temperature and a predetermined temperature value. The reference resistor 300 may be mounted on the connector element 13 (see FIG. 8). When the power button 241 is switched on while the measurement device 20 is not connected to the pacifier device 10, as the measurement device 20 does not receive any temperature signal, a specific message (e.g., "Err") is shown on the display 243. It is only when the measurement device 20 is connected to the pacifier device 10 then an effective and complete temperature measurement circuit is formed to measure body temperatures. The measurement device 20 contains most of the components of the temperature measurement circuit and mainly processes the temperature signals gathered by the temperature sensing element 14, converts the signals to data, and then outputs the data to the display 243. The circuit board 24 is also connected to a flexible cable element 25 having a pre-determined length. On the other end of the cable element 25, there is a receptacle element 26 for joining with the plugs 131 of the connector element 13.

The pacifier device 10 and the measurement device 20 are firmly and stably attached together once the connector element 13 is joined to the receptacle element 26. The cable element 25 could be wound around the flange 23 of the bottom cover 22 so as to adjust the distance between the pacifier device 10 and the measurement device 20.

Once the measurement device 20 is connected to the pacifier device 10 via the foregoing connection mechanism, the incomplete temperature measurement circuit of the circuit board of the measurement device 20 now becomes complete and functional with its connection to the temperature-sensing element 14 of the pacifier device 10. When the pacifier device 10 is connected to the measurement device 20, the now completed temperature measurement circuit is started, either automatically or later by the trigger of the power button 241, to take temperature measurements until the pacifier thermometer has reached a stable reading. As described earlier that the pairing of the reference resistor and the thermistor has a noon-replaceable relationship. Therefore, during production and packaging, the temperature sensing element 14 and the reference which has the best pairing and jointly would produce the most accurate temperature measurement should be packaged together, or they should have their resistance values and resistor types marked or labeled so that a user could correctly pair a pacifier device 10 with a measurement device 20 and obtain accurate temperature measurements.

Based on the foregoing description, it could be seen that the attachment and detachment of the pacifier device 10 and the measurement device 20 are easy and convenient. The pacifier device 10 (the temperature sensing element 14) therefore could be replaced easily and could be cleaned and sterilized without causing damages to the electronic components in the measurement device 20.

Additionally, the display 243 of the measurement device 20 is equipped with a backlight plate 246, which is controlled by a delay circuit and a reset circuit of the circuit board 24. When a complete temperature measurement circuit is formed by the connection of the pacifier device 10 and the measurement device 20 to take temperature measurements, the buzzer 244 would deliver an audible signal when the now completed temperature measurement circuit reaches a stable reading. In the mean time, the backlight plate 246 is lit for about 5~10 seconds so that the measurement result shown on the display is more recognizable. Then the backlight plate 246 and the measurement device 20 are turned off automatically. If a user cannot recognize the measurement result within this period of time, the user could hold down the power button 241 before the measurement device 20 is turned off and the backlight plate 246 would remain lit. When the user releases the power button 241, both the backlight plate 241 and the measurement device 20 would be turned off simultaneously.

In some embodiments, the temperature sensing element 14 could also deliver the temperature signal using radio transmission to the measurement device 20. In these embodiments, there is a radio emission circuit (not shown in the drawings) incorporated in the temperature sensing element 14 or the connector element 13. There is also a radio reception circuit incorporated into the incomplete temperature measurement circuit of the circuit board 24 so as to pass the temperature signals to the integrated circuit on the circuit board 24.

There are also some embodiments in which the reference resistor is also installed inside the pacifier device 10. By combining the reference resistor and the temperature sensing element 14 having the best pairing together inside the pacifier device 10, a user is removed from the burden of selecting the most compatible pacifier and measurement devices 10 and 20.

Figure 3:
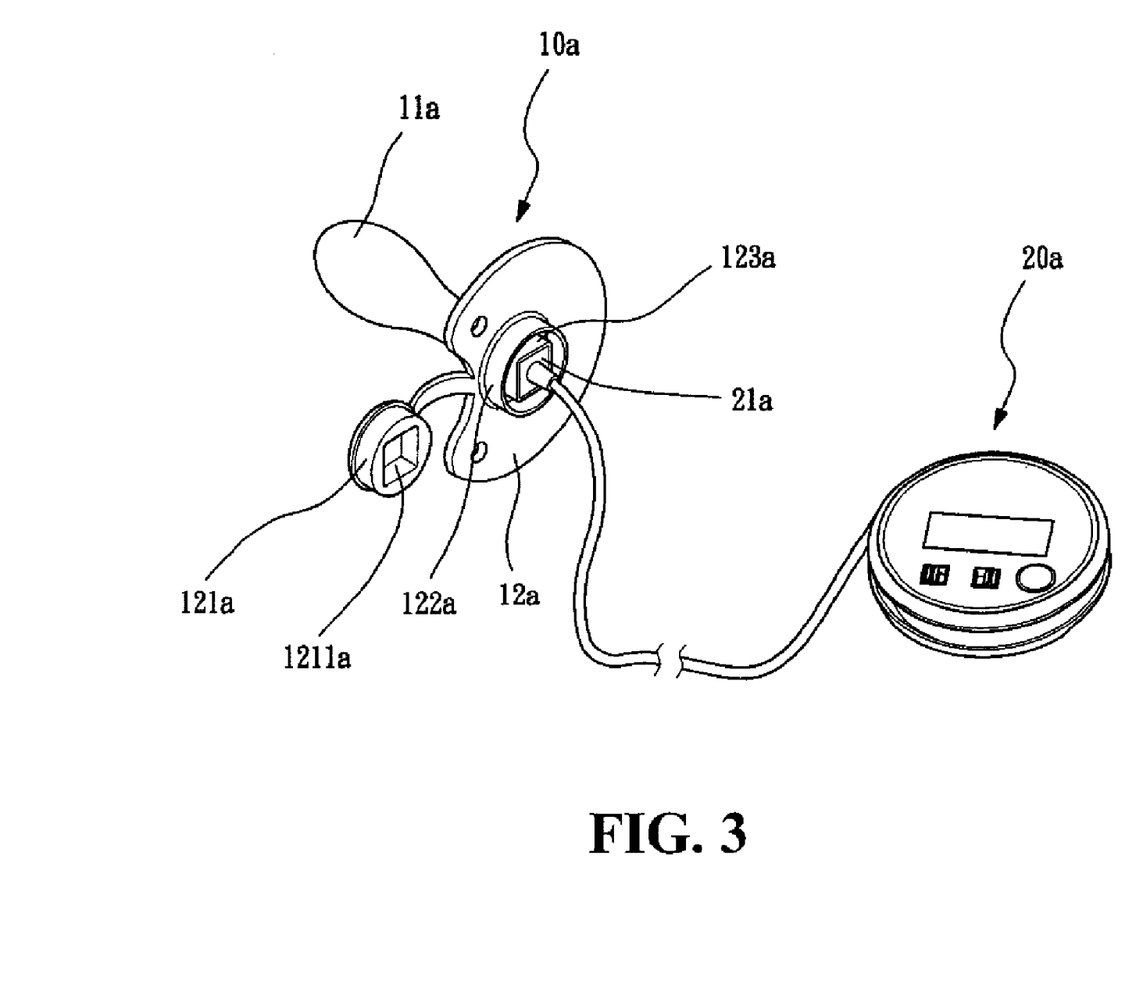
FIG. 3 is a perspective view showing a pacifier thermometer according to another embodiment of the present invention.
Figure 4:
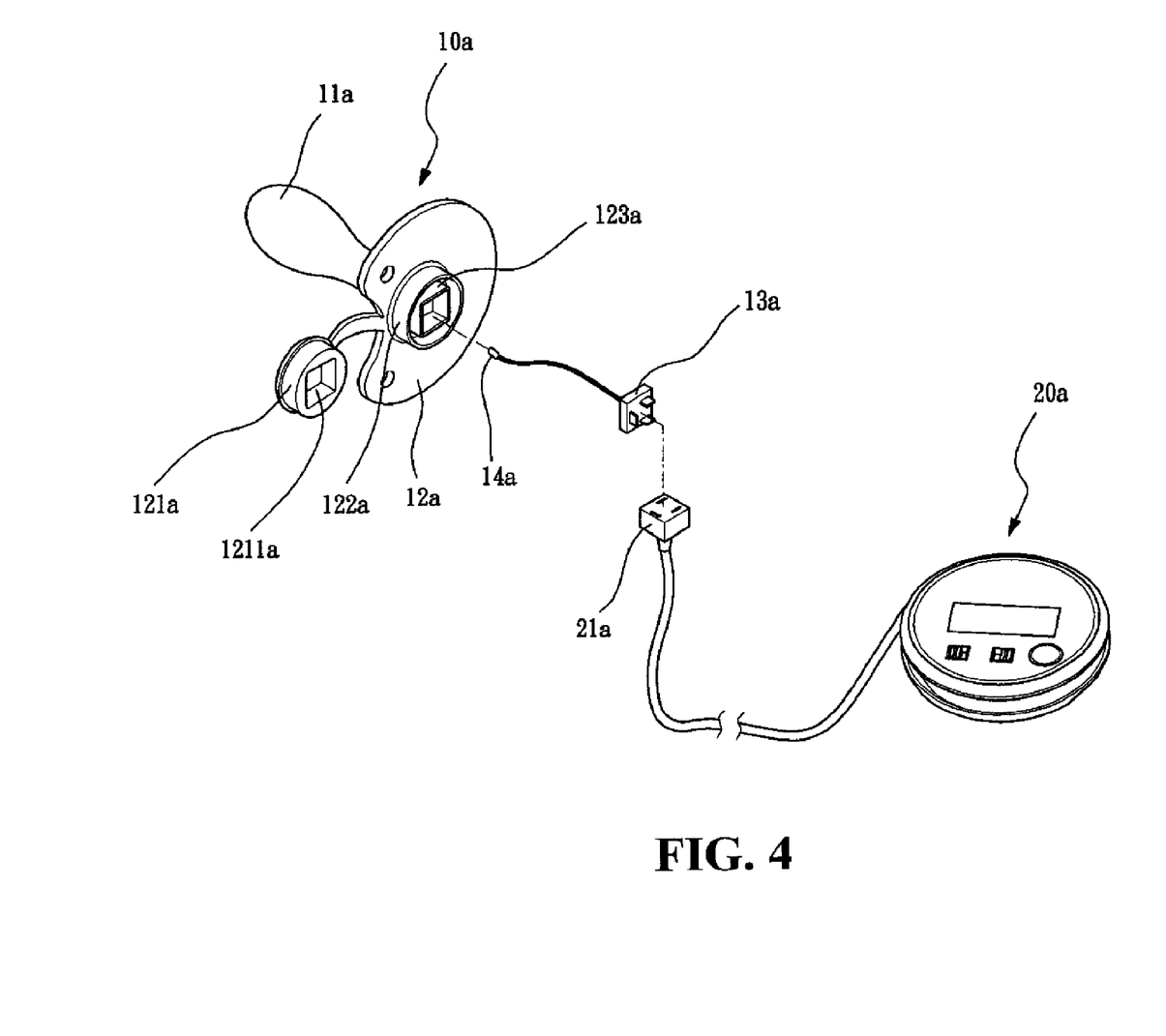
FIG. 4 is a perspective view showing the attachment of the pacifier device and the measurement device of the pacifier thermometer of FIG. 3.
Figure 5:
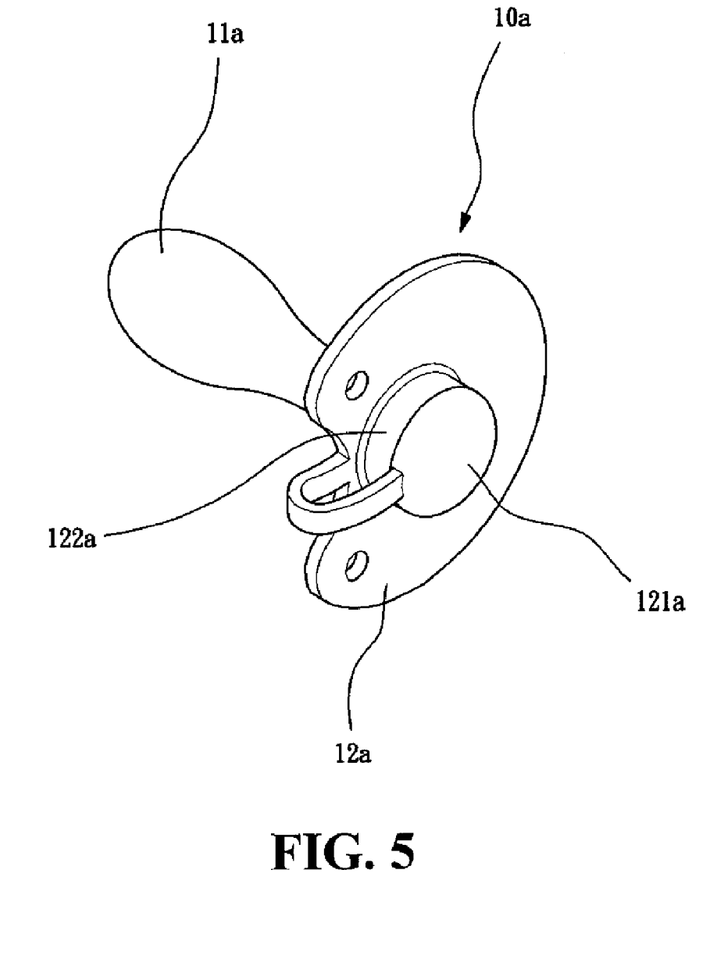
FIG. 5 is a perspective view showing the pacifier device of the pacifier thermometer of FIG. 3.

Please refer to FIGS. 3, 4, and 5, which show a pacifier thermometer according to another embodiment of the present invention. As illustrated, the pacifier device 10a of the present embodiment also has a mouth member 11a and a supporting member 12a. The supporting member 12a has an additional cover element 121a having a rectangular opening 1211a. Correspondingly, the circular compartment 122a has a rectangular seat 123a for housing the connector element 13a and the receptacle element 21a when they are joined together. When the pacifier device 10a and the measurement device 20a are separated apart, the circular compartment 122a could be sealed by the cover element 121a so as to protect the temperature sensing element 14a and the connector element 13a from dust and wetness.

Figure 6:
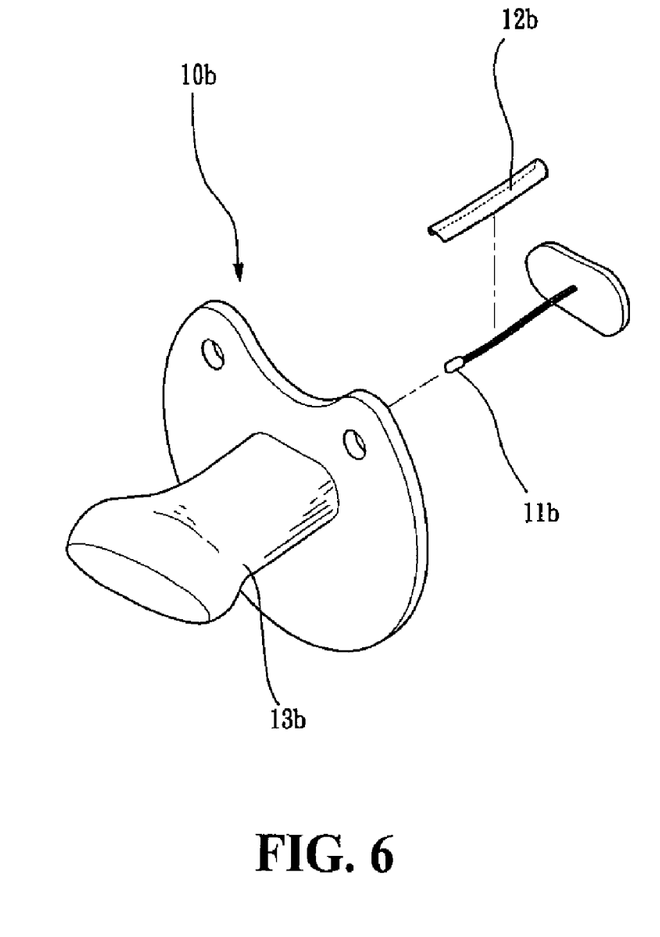
FIG. 6 is a perspective explosion view showing a pacifier device according to an embodiment of the present invention.
Figure 7:
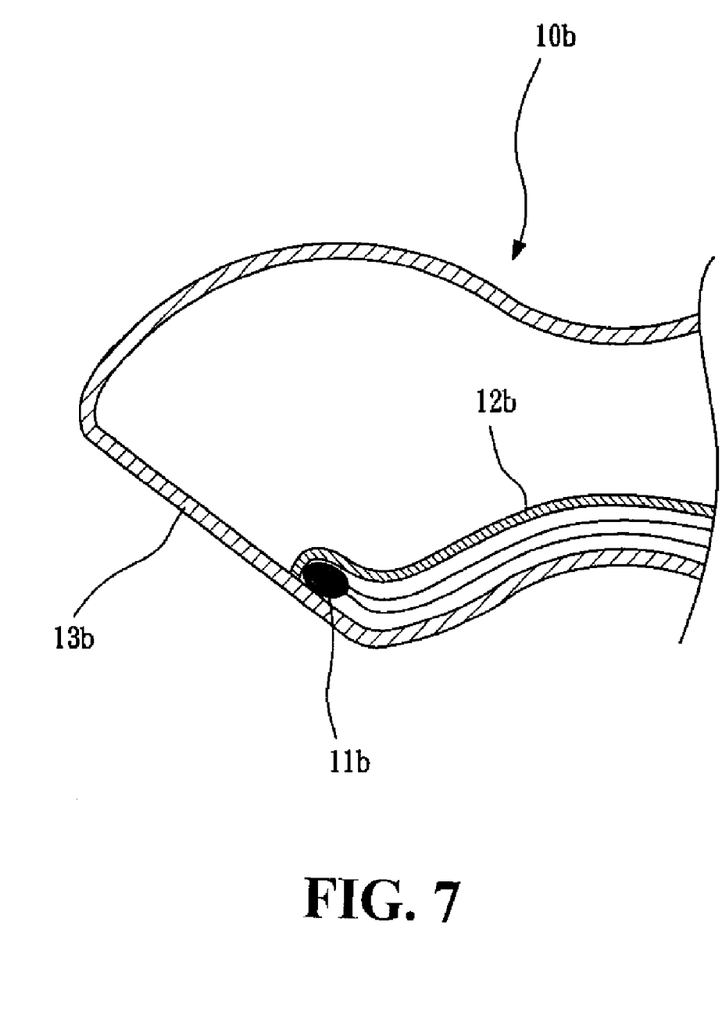
FIG. 7 is a sectional schematic view showing the pacifier device of FIG. 6.

Please refer to FIGS. 6 and 7, which show an embodiment of the pacifier device 10b according to the present invention. As illustrated, the temperature sensing element 11b is covered by a trough element 12b and the trough element 12b is adhered to the mouth member 13b so as to fixedly install the temperature sensing element 11b in the pacifier device 10b.

Figure 8:
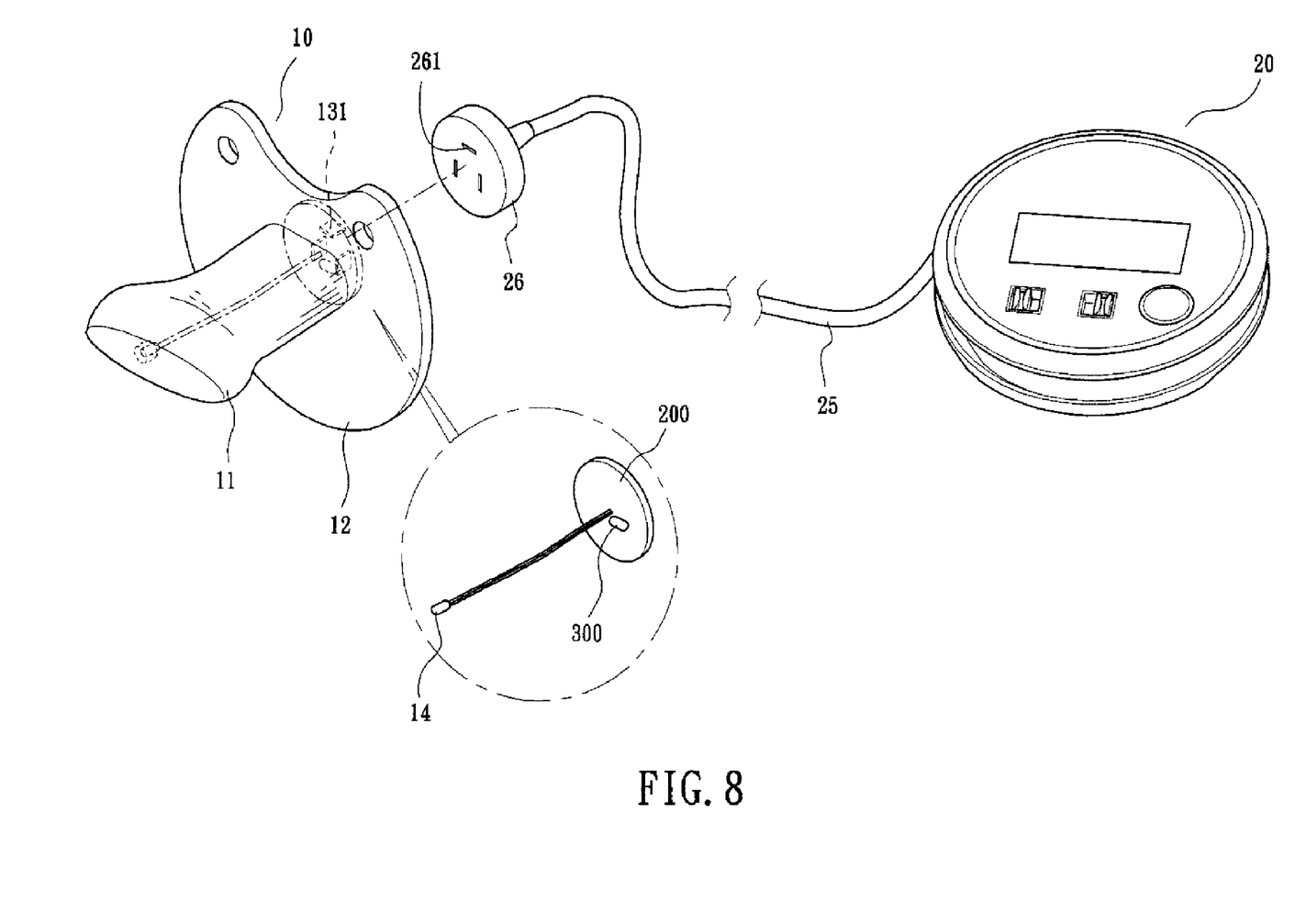
FIG. 8 illustrates another preferred embodiment of the pacifier thermometer according to the present invention.

FIG. 8 illustrates another preferred embodiment of the present invention. As shown, the pacifier 10 comprises a mouth member 11 and a supporting member 12. The supporting member 12 is formed with a circular opening in which is fitted a connector element 200 with a plurality of plugs 131 mounted on the outer side thereof. The plugs 131 are adapted to be connected with the slots 261 of the receptacle element 26 which is connected to the measurement device 20 via a cable element 25. A temperature sensing element 14 is connected to one of the plugs 131 by an electrical wire. A reference resistor 300 is mounted on the connector element 200 and electrically connected with another one of the plugs 131. The connector element 200 is dimensioned to be fitted in the circular opening of the supporting member 12 and secured thereto by any means well known to the art. When the connector element 200 is engaged with the circular opening of the supporting member 12, the temperature-sensing element 14 will be disposed within the mouth member 11.

From the foregoing detailed description, it could be seen that a pacifier thermometer according to the present invention is structurally separated into a pacifier device and a measurement device that could be easily attached together or detached apart. The pacifier thermometer according to the present invention not only could obtain accurate body temperature measurements, but also could facilitate the replacement, cleaning, and sterilization of the pacifier for superior sanitation and safety.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pacifier thermometer comprising:
    a pacifier device having a mouth member and a supporting member, said supporting member having an opening allowing said mouth member to pass through for joining said supporting member and said mouth member together, said supporting member having a circular compartment which receives a connector element having a plurality of plugs, said connector element being connected to a temperature sensing element covered by a trough element which is adhered to said pacifier device so as to fixedly install said temperature sensing element in said pacifier device, said connector element being provided with a reference resistor whose resistance difference relative to said temperature sensing element of said pacifier device linearly corresponds to a temperature difference between a measured temperature and a pre-determined temperature value, said pacifier device having a flexible cover element which has an hollow seat for accommodating said connector element, said flexible cover element being engageable with said circular compartment for protecting said temperature sensing element and said connector element from dust and wetness;
    a measurement device having a top cover and a bottom cover, a circuit board housed between said top cover and said bottom cover, said circuit board comprising an incomplete temperature measurement circuit missing at least a temperature sensing element, a display mounted on said top cover, a flat-shaped buzzer installed in a through hole of said circuit board, a backlight plate positioned behind said display, and a delay circuit and a reset circuit on said circuit board for controlling said backlight plate; and
    a cable element for connecting said circuit board to a receptacle element which is engageable with said connector element, said cable element having a pre-determined length which is wound around a flange of said measurement device, and having a receptacle element at an end for joining with said connector element of said pacifier device;
    wherein a complete and functional temperature measurement circuit is formed to take body temperatures when said connector element is joined with said cable element and said flexible cover element is engageable with said circular compartment for protecting said temperature sensing element and said connector element from dust and wetness when said pacifier device is not attached to said measurement device.

2. The pacifier thermometer according to claim 1, wherein said pacifier device is a single piece which is molded using a soft material.

3. The pacifier thermometer according to claim 1, wherein said missing temperature sensing element of said incomplete temperature measurement circuit is a temperature sensor.

4. The pacifier thermometer according to claim 1, wherein a radio emission circuit is incorporated inside one of said temperature sensing element or said connector element, and a radio reception circuit is incorporated into said incomplete temperature measurement circuit so that temperature signals are transmitted wirelessly from said temperature sensing element to said integrated circuit.

* * * * *